United States Patent [19]

McMurtry et al.

[11] Patent Number: 5,446,970
[45] Date of Patent: Sep. 5, 1995

[54] PROBE ARM FOR MACHINE TOOL

[75] Inventors: David R. McMurtry, Wotton-Under-Edge; Andrew J. Harding, Bristol; Martin P. Spivey, Tetbury, all of United Kingdom

[73] Assignee: Renishaw plc, Gloucestershire, United Kingdom

[21] Appl. No.: 231,294

[22] Filed: Apr. 22, 1994

[30] Foreign Application Priority Data

Apr. 22, 1993 [GB] United Kingdom ............... 9308364

[51] Int. Cl.⁶ .................... G01B 5/012; F16D 71/04
[52] U.S. Cl. ............................. 33/572; 33/559; 33/561; 192/139; 192/142 R
[58] Field of Search ............. 33/556, 558, 559, 561, 33/503, 1 D, 572; 192/139, 142 R

[56] References Cited

U.S. PATENT DOCUMENTS

| | | | |
|---|---|---|---|
| 4,168,576 | 9/1979 | McMurtry | 33/559 |
| 5,084,981 | 2/1992 | McMurtry et al. | 33/1 D X |
| 5,088,337 | 2/1992 | Bennett. | |

FOREIGN PATENT DOCUMENTS 0392660 10/1990 European Pat. Off. ............. 33/559

OTHER PUBLICATIONS

Renishaw Data Sheet TS20 ("Two Axis Tool Setting Probe for CNC Lathes") published Oct. 1992 (revised version of original data sheet dated 1987).
Renishaw Data Sheet HPA ("High Precision Tool Setting Arm for CNC Lathes") published Mar. 1991 (revised version of original data sheet dated 1988).
Yamazaki Mazak brochure "Quick Turn 35N", p. 6, publication date uncertain but approximately 1990.
Yamazaki Mazak brochure "Slant Turn 28N & 35N", p. 8, publication date uncertain but approximately 1990.
H. J. J. Braddick "Mechanical Design of Laboratory Apparatus", Chapman & Hall, London, 1969, pp. 11–30.

*Primary Examiner*—Alvin Wirthlin
*Attorney, Agent, or Firm*—Oliff & Berridge

[57] ABSTRACT

An arm 12 for holding a tool-setting probe 14 in a machine tool is rotatable between an operative position and an inoperative position. The operative position is defined by elements 48,52 which form a stop against further rotary motion beyond the operative position. These elements 48,52 are arranged as a kinematic support, so that the operative position is defined in a precisely repeatable manner. Springs 40 urge the elements 48,52 together. When the arm is in the operative position, these springs are stretched by a repeatable amount, so that they provide a repeatable force, in order to increase the precision of the operative position.

20 Claims, 3 Drawing Sheets

PROBE ARM FOR MACHINE TOOL

FIELD OF THE INVENTION

This invention relates to a mechanism for indexing to a defined rotary position. It can be used for an arm for holding a probe in a machine tool.

DESCRIPTION OF PRIOR ART

It is known to mount a tool setting probe in a machine tool. The probe is mounted to the bed or table of the machine tool, such that a cutting tool can be moved into contact with it. This enables the location of the cutting tip of the tool to be established, in order to set offsets associated with the tool for use by the numerical control of the machine.

In many machines, the tool setting probe would get in the way if permanently mounted in the required position. Consequently, it is known to mount it on a movable arm, which in turn is mounted to the bed of the machine. In one arrangement, commercially available from Yamazaki Mazak Corporation, the arm is motorised, and can be automatically indexed between an operative position and an inoperative position. In this device, the motor simply drives the arm to a fixed stop, which defines the operative position. However, the fixed stop does not define the position very repeatably, and so there can be a corresponding error in the repeatability of the offsets which are measured by use of the probe.

Another commercially available arrangement is the Renishaw High Precision Arm (HPA), comprising an arm which can be mounted in the operative position on a base, via a kinematic support. The kinematic support ensures that the arm (and thus the probe) is positioned in a highly repeatable manner, so that the offsets may be determined repeatably. The arm is mounted manually, by offering the arm up to the base and fastening it in position; it is also demounted manually. The arm is therefore not indexable between operative and inoperative positions.

The kinematic support, as used in the Renishaw High Precision Arm, comprises elements on the arm which are arranged to cooperate with elements on the base to give the highly repeatable positioning. Specifically, the elements on the base are arranged to provide a pair of mutually converging surfaces at each of three spaced locations, in such a manner as to provide a total of six points of contact with the elements on the arm. This constrains the six possible degrees of freedom of the arm relative to the base. The six points of contact are all in the same plane, and the converging surfaces converge in a direction normal to that plane.

Such a kinematic support is sometimes known as a Boys support, and is described in, for example, H. J. J. Braddick, "Mechanical Design of Laboratory Apparatus", Chapman & Hall, London, 1960, pages 11–30. Braddick also describes a functionally equivalent kinematic support, sometimes known as a Kelvin support, in which the six points of contact or constraints are provided three at a first location, two at a second spaced location, and one at a third spaced location. The terms "kinematic", "kinematically constrained" and like terms, as used in this specification, encompass Boys supports, Kelvin supports and other kinematic and semi- or quasi-kinematic types of support.

U.S. Pat. No. 5,088,337 describes a head for mounting a probe in a coordinate measuring machine. The head enables the probe to be rotated manually to any of a number of index positions, each of which is defined by a kinematic support. The elements making up the kinematic support are urged into engagement in the axial direction, necessitating a relatively complex mechanism for unlocking and locking the axial force before and after each rotary movement.

Similar heads are commercially available which contain motors for automatically rotating the probe between the index positions, for example the Renishaw PH10M probe head.

SUMMARY OF THE INVENTION

One broad aspect of the invention provides a mechanism which can be indexed to a defined rotary position, having a novel kinematic support for defining that position. Another aspect of the invention relates to an arm which can be moved between operative and inoperative positions, and which is kinematically supported when in the operative position. In a further aspect, the invention provides means for ensuring that the arm is clamped into the kinematic support with a repeatable force, in order to improve the repeatability of the positioning.

BRIEF DESCRIPTION OF THE DRAWINGS

Preferred embodiments of the invention will be described by way of example, with reference to the accompanying drawings, wherein.

DESCRIPTION OF PREFERRED EMBODIMENTS

Figure 1:
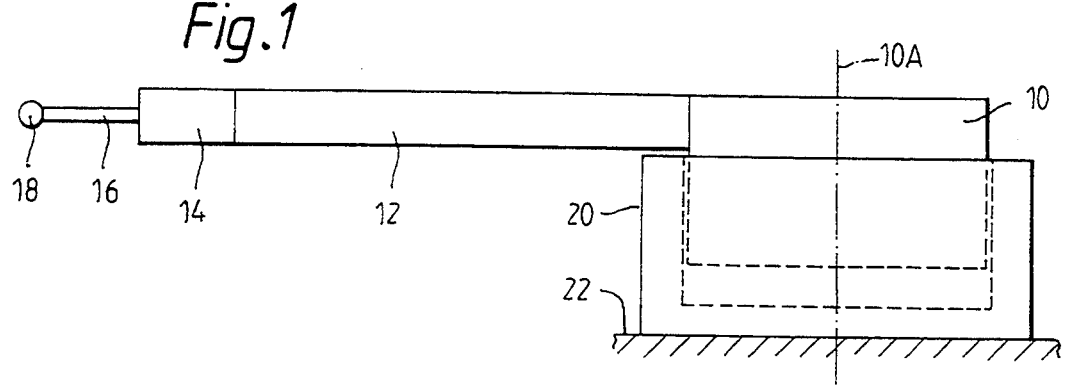
FIG. 1 is a side view of a probe-carrying arm and a device for rotating it automatically.

The device shown in FIG. 1 comprises a rotatable hub 10 carrying a radially-projecting arm 12. A probe 14 is mounted at the free end of the arm 12, and has a deflectable stylus 16. The probe 14 can be, for example, a touch trigger probe of the type described in U.S. Pat. No. 4,153,998. Its stylus 16 may have a conventional spherical tip 18 as shown, or the tip 18 may be replaced by a conventional tool setting tip, e.g. cube-shaped.

The hub 10 is mounted in a housing 20 in a manner described below, so as to be rotatable about its axis 10A. The housing 20 is mounted to convenient fixed structure 22, such as the bed of a lathe or grinding machine or other machine tool.

Figure 2:
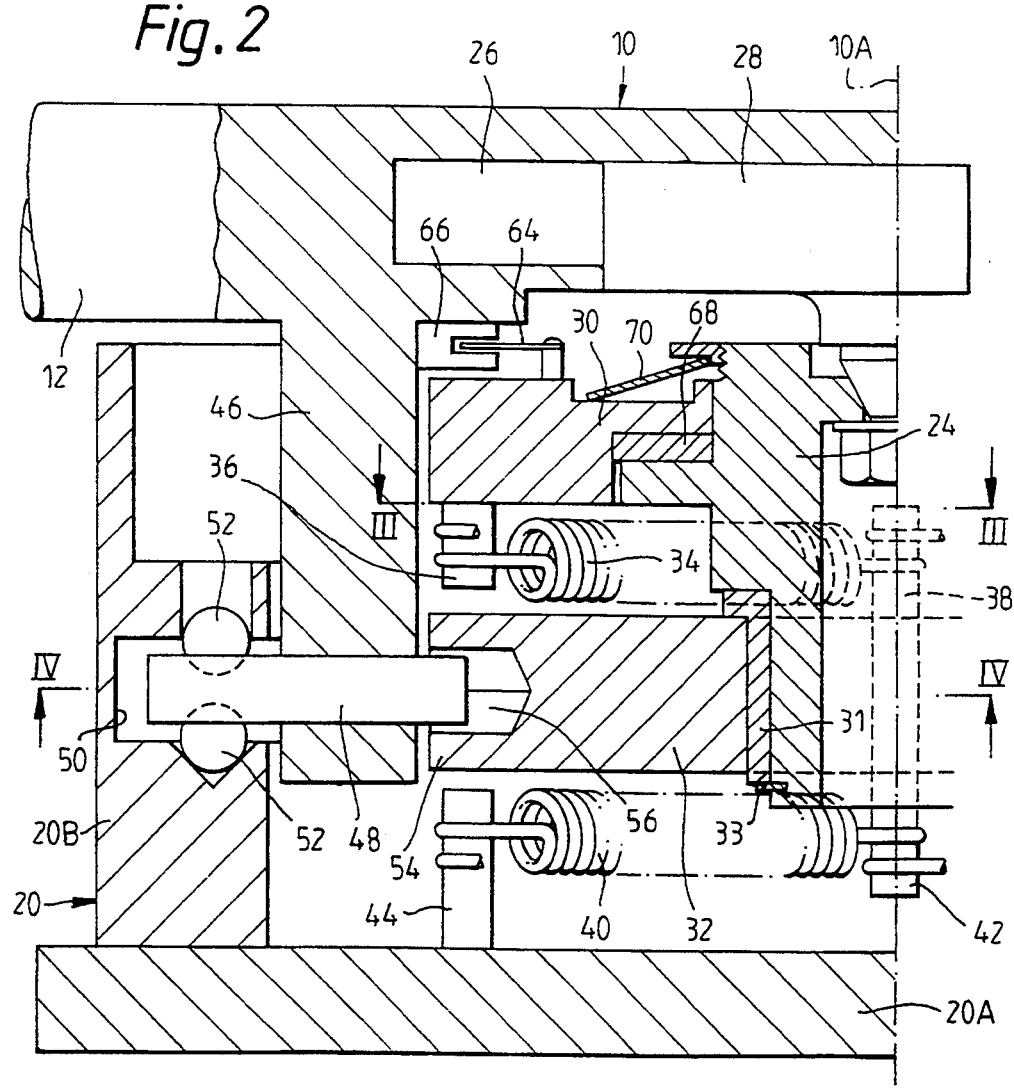
FIG. 2 is an enlarged cross-section of part of the device shown in FIG. 1.

As seen in FIG. 2, within the hub 10 there is provided a concentric rotor 24, mounted on the output pinion of a worm drive 28. The worm drive 28 has a motor 26, also within the hub 10. If necessitated by space restrictions, the motor 26 may be located within the arm 12. The hub 10 and rotor 24 are rotatable relative to each other about the axis 10A, by means of the motor 26 acting through the worm drive 28.

The rotor 24 carries a rotor disc 30, which rotates with it. It also carries an intermediate disc 32, which is rotatable relative to the rotor 24 on a bushing 31. This allows the disc 32 to have a certain amount of play, both radially and axially. The disc 32 is retained by a circlip 33. The bushing 31 and circlip 33 are chiefly provided to aid assembly, and could be omitted if desired. The disc 32 will then be retained solely by springs, which are described below.

Figure 3:
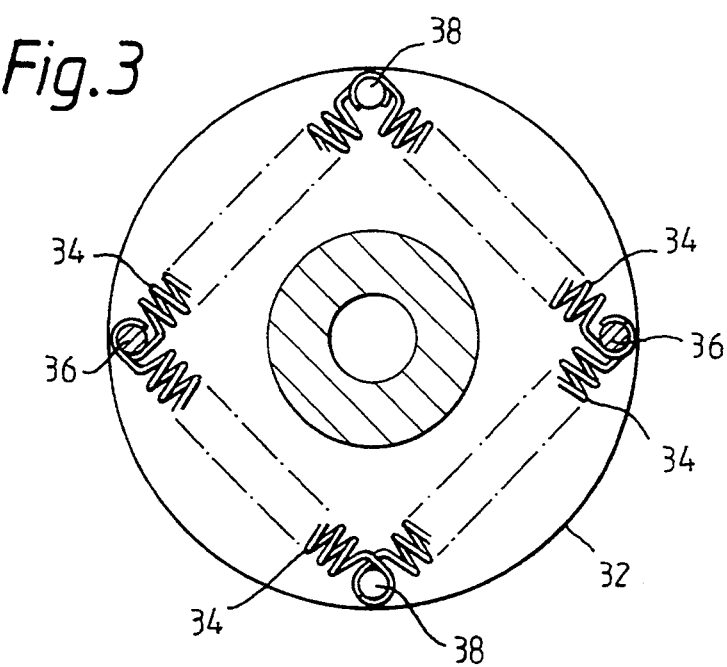
FIG. 3 is a section on the line III—III in FIG. 2.

Referring also to FIG. 3, the rotor disc 30 and intermediate disc 32 are linked by a system of four tension springs 34. The rotor disc 30 has two depending posts 36, while the intermediate disc 32 has two upstanding posts 38. Each spring 34 links one of the posts 36 to an adjacent post 38, the springs thus forming a nominally square configuration when the rotational position of the discs is such that the springs are all equally tensioned.

As partially seen in FIG. 2, a similar system of four tension springs 40 links the intermediate disc 32 to the floor 20A of the housing 20. The intermediate disc 32 has two depending posts 42, while the floor 20A of the housing has two upstanding posts 44, and the springs 40 link these posts, again in a nominally square configuration when the rotational position of the intermediate disc 32 is such that the springs 40 are all equally tensioned. For convenience, each post 42 may be formed integrally with one of the posts 38, by a peg which passes right through the intermediate disc 32.

Figure 4:
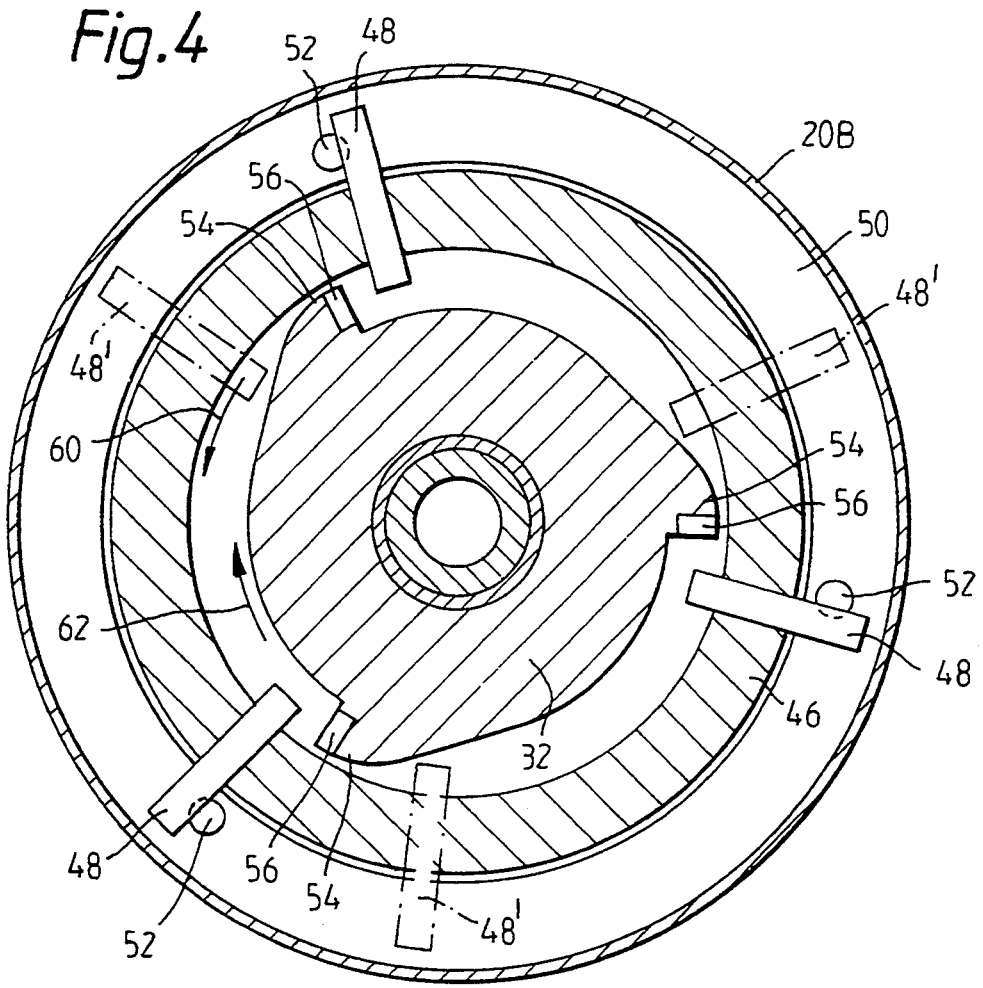
FIG. 4 is a section on the line IV—IV in FIG. 2.

Referring to FIGS. 2 and 4, the hub 10 includes a depending skirt 46, which fits rotatably inside an upstanding wall 20B of the housing 20. The skirt 46 carries three cylinders 48, which project radially both inwardly and outwardly, and which are equally spaced from each other at angles of 120° around the axis 10A.

The rotational mounting between the hub 10 and the housing 20 is deliberately made somewhat sloppy, for reasons explained below. One way in which the rotational mounting can be achieved is by having the outwardly projecting end of each of the cylinders 48 run in a groove 50 on the inside of the wall 20B of the housing.

At three locations spaced equally around the axis 10A, the groove 50 is interrupted by a pair of balls 52 which are spaced apart in the axial direction. Each pair of balls defines a pair of surfaces which are mutually convergent in the circumferential direction, and which confront each other in the axial direction. When the hub 10 is rotated, the outwardly projecting parts of the three cylinders 48 eventually engage with the three pairs of balls 52, giving a total of six points of contact. These six points of contact kinematically define the location of the hub 10, arm 12 and probe 14, relative to the housing 20, when located in this position. This is the operative position in which the probe 14 is used for tool setting or measuring purposes. In this position, it is important that the rotational mounting between the hub 10 and housing 20 should not provide any significant additional constraints, and this is the reason for the somewhat sloppy mounting mentioned above.

Of course, when the hub is not in this kinematically defined location, the rotational mounting can be less sloppy to give smooth running, for example by providing a tighter fit between the free end of the cylinder 48 and the groove 50. One way to achieve this is described below in relation to FIG. 6. Other rotational mounting arrangements are possible, and if there is no groove 50 then the balls 52 may be mounted on three projections on the inner face of the wall 20B.

The intermediate disc 32 has three radially projecting portions 54, seen most clearly in FIG. 4 but omitted from FIG. 3 for simplicity. These portions can engage with the inwardly projecting ends of the cylinders 48.

The portions 54 could carry pairs of balls, like the balls 52, to give fully kinematic location between the intermediate disc 32 and the hub 10. However, this is generally unnecessarily complex. There is a requirement for a defined relationship between the intermediate disc 32 and the hub 10, but this is less so than between the hub 10 and the housing 20. Accordingly, a semi- or quasi-kinematic support suffices in this instance. To achieve this, each projecting portion 54 has a simple radially directed V-groove 56, the sides of which form surfaces which are mutually convergent in the circumferential direction, and which confront each other axially. These surfaces can engage the inwardly projecting end of the cylinder 48. The radial and axial play of the intermediate disc 32 on the rotor 24 facilitates positive engagement. If desired, the arrangement could be simpler still, the projecting portion 54 providing a plain abutment or stop for engaging with the cylinder 48, instead of the V-groove 56. In the latter case, however, there should be no substantial play between the disc 32 and the rotor 24.

The operation of the device will now be explained.

When the arm 12 is in the inoperative position, the rotational position of the hub 10 is such that the cylinders 48 are in the position shown by broken lines at 48' in FIG. 4. The motor 26 is now operated, acting on the rotor 24 through the worm drive 28. Since the rotor 24 is connected to the housing 20 (via the discs 30,32 and springs 34,40), at first the rotor 24 remains stationary and operation of the motor 26 causes the hub 10 and arm 12 to rotate in the direction of arrow 60 in FIG. 4. This moves the cylinders 48 towards the respective pairs of balls 52.

When the cylinders 48 and balls 52 engage, this locates the hub 10 and the arm 12 kinematically in the operative position, and obviously they can rotate no further. Continued action of the motor 26 therefore causes rotation of the rotor 24 and rotor disc 30 in the opposite sense. The intermediate disc 32 also rotates with the rotor disc 30, as indicated by the arrow 62 in FIG. 4, though to a lesser extent. As the intermediate disc 32 rotates, an opposing pair of the springs 40 are stretched, increasing their tension, while the other two springs 40 are relaxed, reducing their tension. The result is a torque applied between the intermediate disc 32 and the housing 20. Similarly, the tensions of the springs 34 are respectively increased and decreased, giving a similar torque between the discs 30 and 32.

After a certain amount of rotation of the intermediate disc 32, the V-grooves 56 in the projections 54 engage with the inner ends of the cylinders 48. They are held in engagement by the torque provided by the springs 34. This torque continues to increase, because the rotor disc 30 continues to rotate relative to the intermediate disc 32 (which is now stationary). Eventually, continued rotation of the disc 30 causes a rotor arm 64 (which is attached to the disc 30) to interrupt a light beam in an opto-electronic switch 66 attached to the housing. This stops the motor 26 and brings the rotor 24 and rotor disc 30 to a standstill. An electro-mechanical microswitch can be used in place of the switch 66, if desired.

The arm 12 is now held clamped in the kinematically-defined operative position as follows. The torque provided by the springs 34 exceeds that provided by the springs 40, thereby holding the V-grooves 56 of the intermediate disc 30 in contact with the inner ends of the cylinders 48. However, the torque from the springs 34 acts through a closed loop which includes the rotor 24 and the hub 10, but which excludes the kinematic location between the cylinders 48 and balls 52. Consequently, the (somewhat unpredictable) torque provided by the springs 34 does not affect the kinematic location.

The force which clamps the cylinders 48 into the balls 52 is provided solely by the torque of the springs 40 acting between the intermediate disc 32 and the housing 20. This torque is caused by a defined amount of rotation of the disc 32 relative to the housing 20, determined by the position of the engagement of the V-grooves 56 with the cylinders 48. This stretches and relaxes the springs 40 by a predetermined amount, controlled only by the geometry of the system. It follows that the clamping force between the cylinders 48 and balls 52 is quite repeatable. That is, the same clamping force will be applied each time the device is operated. This is important, because if the force were unpredictable, it could affect the precise location provided by the kinematic support or mounting.

Thus, the repeatability of the clamping force assures the repeatability of the kinematic location. In turn, this assures the repeatable positioning of the probe 14 when in the operative position, and thus the repeatability of the tool setting offsets which are measured with the probe, or any other measurements which it is used to make.

In the above description, it has been assumed that the rotor 24 and rotor disc 30 rotate together as a unit. Indeed, that is normally the case. However, preferably a clutch is provided between the two. As shown in FIG. 2, this may comprise an annulus of friction material 68 trapped between two flanges on the rotor 24 and disc 30, which are urged towards each other by a spring washer 70. This clutch acts as a safety device, should the opto-electronic switch 66 fail to stop the motor 26 for any reason. Stops (not shown) may be provided between the rotor disc 30 and the hub 10, and as soon as the stops engage, the clutch 68 starts to slip. This prevents overstretching of the springs 34 and stalling of the motor 26.

Of course, this safety arrangement may be modified. In one modification, there are no stops between the disc 30 and hub 10, the clutch 68 slipping simply when the torque provided by the springs 34 exceeds a certain threshold. In another modification, the opto-electronic switch 66 and rotor arm 64 may be omitted, the motor 26 being cut out by a current monitoring device which acts when the motor current exceeds a certain value as the torque of the springs 34 increases, or as the stops between the disc 30 and the hub 10 engage. Alternatively, if the motor 26 is sufficiently robust, it may simply be allowed to stall. In any of the above modifications, the clutch 68 may be omitted.

The device described may be simplified by the omission of the springs 34, if desired. A single disc having the projections 54 is now provided to rotate with the rotor 24, in place of the two discs 30,32. When the projections 54 engage with the inner ends of the cylinders 48, they are held in engagement by continued action of the motor 26, the clutch 68 slipping continuously in this state. Alternatively, the clutch 68 can be omitted, the motor 26 can be allowed to stall or it can be cut off by a current monitoring device. The torque on the disc is now maintained by the worm drive 28 jamming, in order to keep the projections 54 in engagement with the cylinders 48. None of these arrangements is preferred, however.

Figure 5:
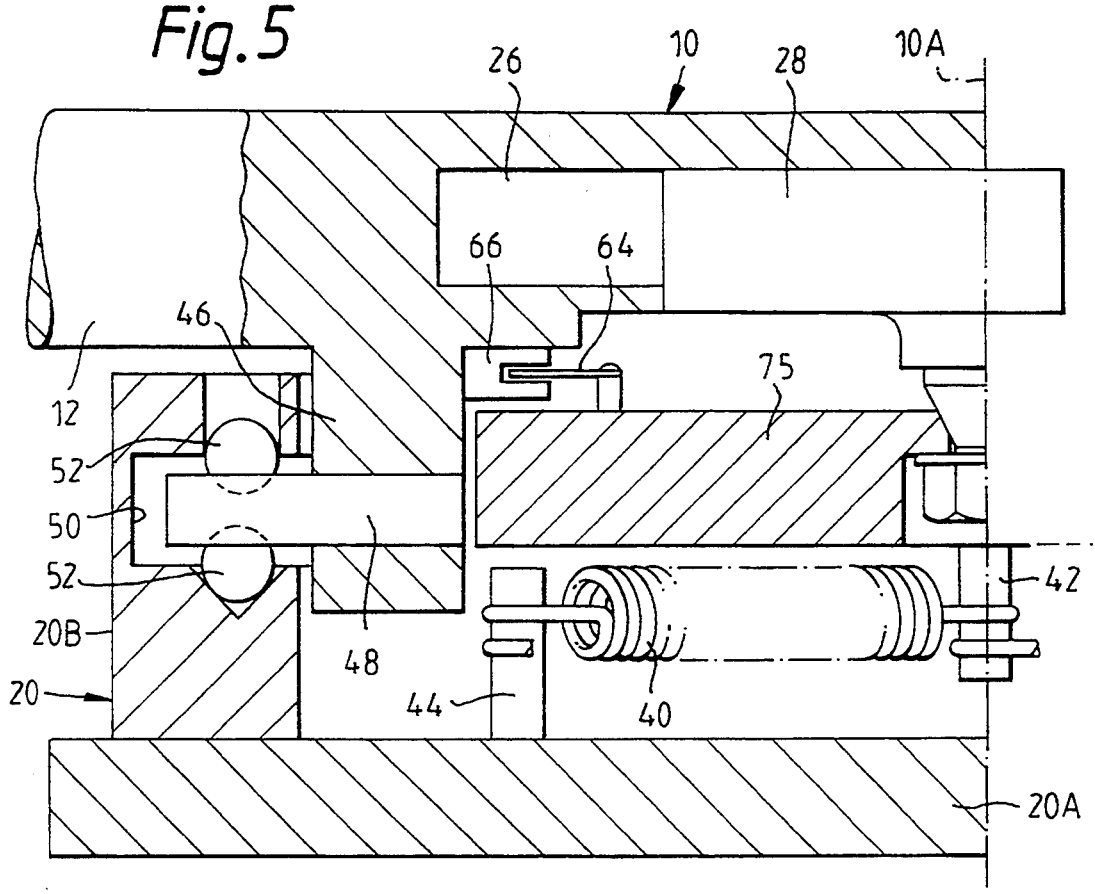
FIG. 5 is a section similar to FIG. 2, but showing a modified device.

FIG. 5 shows an even simpler arrangement, the same reference numerals being used as in FIG. 2 where appropriate. The discs 30,32 are replaced by a single disc 75 attached to the output pinion of the worm drive 28. As above, the springs 34 are omitted, and the disc 75 is connected to the floor 20A of the housing through the posts 42,44 and the four tension springs 40. In this present arrangement, the projections 54 and V-grooves 56 are also omitted, and the cylinders 48 do not project inwardly from the skirt 46.

When the motor 26 operates, at first the hub 10 rotates in the housing 20 as previously, until the cylinders 48 engage kinematically with the pairs of balls 52. Next, the disc 75 rotates in the opposite sense relative to the hub 10, causing an increasing torque to be applied by the springs 40. This continues until the arm 64 meets the opto-electronic switch 66, cutting off the motor. As previously, the switch 66 can be replaced by an electromechanical microswitch, if desired.

The cylinders 48 are now clamped into the pairs of balls 52 by a force which is set by the torque in the springs 40 when the disc 75 comes to rest. This torque depends on the characteristics of the switch 66, the motor 26 and the worm drive 28, and on the inertia of the system. However, it can still be adequately repeatable to ensure that the kinematic positioning of the arm 12 is sufficiently repeatable for many purposes.

Figure 6:
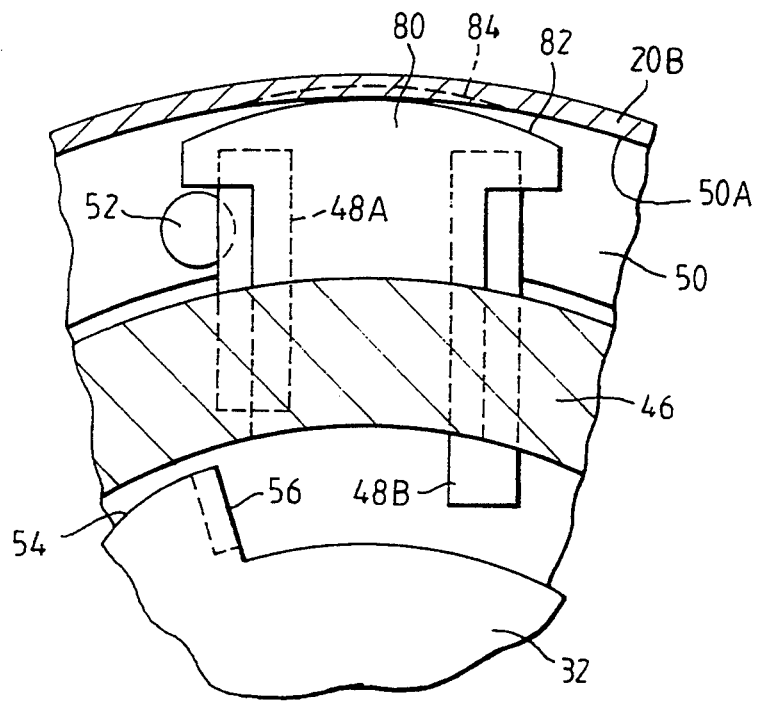
FIG. 6 is a section on the same line as FIG. 4, but showing part of another modified device.

FIG. 6 shows a further modification of the device of FIGS. 2-4, in which each cylinder 48 is replaced by a pair of cylinders 48A,48B. These are both mounted in the skirt 46 of the hub 10, and a plastic unit 80 is held between them. The cylinder 48A engages the balls 52, as before. Both this cylinder and the balls may be made from tungsten carbide, for reliable kinematic location. Only the cylinder 48B projects inwardly to engage the V-groove 56 in the projection 54, and this cylinder can be made from steel since its role is less demanding. The outer edge 82 of the plastic unit 80 is curved as shown, and has only a very small clearance from the bottom 50A of the groove 50, providing for smooth rotation of the hub 10 in the housing 20. Similarly, the top and bottom surfaces of the unit 80 may be curved and have only very small clearances from the opposing sides of the groove 50. The unit 80 may be made from a low friction material, such as PTFE. To prevent undue constraints when the cylinders 48A and the balls 52 are kinematically engaged, the bottom 50A of the groove 50 may be slightly relieved in the region of the balls 52, as indicated by the broken line 84, and the sides of the groove 50 may likewise be relieved in this region.

Various modifications for the kinematic support formed by the cylinders 48 and balls 52 will be apparent to the skilled man.

In one possible modification, the three cylinders 48 may be replaced by three balls, mounted on a radial projection from the skirt 46 so as to face in the circumferential direction. These then cooperate respectively with three radially directed V-grooves, which have circumferentially directed mutually convergent surfaces similar to the V-grooves 56 but formed in the housing 20 in place of the pairs of balls 52. Each of these V-grooves may be replaced by a pair of parallel cylinders, extending radially and spaced apart axially.

Alternatively, instead of three such V-grooves, one of the balls on the skirt 46 cooperates with a flat surface on the housing 20; one with a radial V-groove or pair of cylinders; and one with a trihedral or conical hole, or with a nest of three balls on the housing 20. These elements each face in appropriate directions to ensure proper kinematic constraint. This arrangement can be considered as a modified Kelvin support, whereas the cylinders 48 and balls 52 can be considered as a modified Boys support.

It is also possible to provide an inverse arrangement for the cylinders 48 and balls 52, in which the cylinders 48 are on the housing 20 and the balls 52 are on the skirt 46. Similar inverse arrangements can be devised for the various modified kinematic supports just discussed.

In the above embodiments, tension springs have been used to bias the elements of the kinematic support in the circumferential directions into engagement with each other. Of course, other bias means may be used, such as torsion springs, or even a suitable arrangement of magnets.

As mentioned above, the device can be mounted on fixed structure of a machine tool, such as the bed of a lathe or grinding machine, so that the probe 14 acts as a tool setting probe. Alternatively, however, it is possible to mount the device on the moving structure of a machine tool, for example the spindle of a machining centre, the turret of a lathe or the carriage which holds the grinding wheel in a grinding machine. The probe may then be swung into the operative position in order to make the measurements on a workpiece which is mounted on the machine tool. In a grinding machine, for example, this may include location of features of the workpiece which are to be ground, after which the arm 12 is swung into the inoperative position to permit accurate grinding of those features. In a lathe, when the arm 12 is in the operative position it may effectively provide an extension to the turret, enabling probing of the blind side of a workpiece which the turret normally cannot reach. This can enable, for example, measurement of the diameter of a workpiece held stationary in the chuck of the lathe, to determine whether any thermal drift has taken place between the centre line of the lathe chuck and the turret. Such thermal drift would cause diameters to be machined oversize or undersize.

We claim:

1. A rotary mechanism comprising:
   a fixed member;
   a rotatable member which is rotatable relative to the fixed member;
   a stop between the fixed and rotatable members, which defines an index position in the rotation of the rotatable member and prevents further rotation thereof past the index position;
   means for biasing the rotatable member into engagement with the fixed member in a circumferential direction at said stop when the rotatable member is in the index position;
   wherein said stop comprises at least one element in each of three circumferentially spaced locations on the rotatable member; and at least one element in each of three corresponding circumferentially spaced locations on the fixed member;
   said elements on the fixed and rotatable members at each said location being urged together in the circumferential direction by the biasing means;
   said elements cooperating with each other to constrain the degrees of freedom of the rotatable member kinematically, thereby precisely defining the index position of the rotatable member.

2. A mechanism according to claim 1, wherein said at least one element at one of said locations on one of said fixed and rotatable members define surfaces which are mutually convergent in the circumferential direction.

3. A mechanism according to claim 2, wherein said mutually convergent surfaces confront each other in the axial direction.

4. A mechanism according to claim 2, wherein said at least one element which defines mutually convergent surfaces 5. A mechanism according to claim 2, wherein said at least one element which defines mutually convergent surfaces comprises a V-groove.

6. A mechanism according to claim 2, wherein said at least one element which defines mutually convergent surfaces comprises a pair of cylinders. comprise a pair of balls.

7. A mechanism according to claim 1, wherein said biasing means provides a repeatable biasing force when the rotatable member is in the index position.

8. A mechanism according to claim 7, wherein the biasing means comprises at least one spring, which is stretched by a repeatable amount when the rotatable member is in the index position.

9. A mechanism according to claim 8, including a further stop, which when engaged defines said repeatable stretching of said at least one spring.

10. A mechanism according to claim 7, wherein the biasing means is attached to a further rotatable member, which rotates by a repeatable amount after the first-mentioned rotatable member reaches the index position, said repeatable rotation of the further rotatable member providing said repeatable biasing force.

11. A mechanism according to claim 10, including a motor for rotating said further rotatable member, and a switch for switching off the motor when the further rotatable member has rotated by said repeatable amount.

12. A mechanism according to claim 1, including a motor for rotating the rotatable member relative to the fixed member.

13. A mechanism according to claim 12, including a switch for switching off the motor when the rotatable member reaches the index position.

14. A mechanism according to claim 1, in which the rotatable member comprises an arm member for carrying a probe for a machine tool.

15. A probe arm for a machine tool, comprising:
   a fixed base member for attachment to the machine tool;
   a movable arm member for carrying a probe;
   a stop between the fixed and movable members, which defines an operative position in the movement of the movable member and prevents further movement thereof past the operative position;
   means for biasing the movable member into engagement with the fixed member in a circumferential direction at said stop when the movable member is in the operative position;
   wherein said stop comprises elements on the movable member and on the fixed member which are urged together in the circumferential direction by the biasing means;
   said elements cooperating with each other to constrain the degrees of freedom of the movable member kinematically, thereby precisely defining the operative position of the movable member;
   and wherein said biasing means provides a repeatable biasing force when the movable member is in the operative position.

16. A probe arm according to claim 15, wherein the biasing means comprises at least one spring, which is stretched by a repeatable amount when the movable member is in the operative position.

17. A probe arm according to claim 16, including a further stop, which when engaged defines said repeatable stretching of said at least one spring.

18. A probe arm according to claim 15, wherein the biasing means is attached to a further movable member, which moves by a repeatable amount after the first-mentioned movable member reaches the operative position, said repeatable movement of the further movable member providing said repeatable biasing force.

19. A probe arm according to claim 18, including a motor for moving said further movable member, and a switch for switching off the motor when the further movable member has moved by said repeatable amount.

20. A probe arm according to claim 15, including a motor for moving the movable member relative to the fixed member.

* * * * *